(12) United States Patent
Zhang et al.

(10) Patent No.: US 9,537,675 B2
(45) Date of Patent: Jan. 3, 2017

(54) METHOD AND APPARATUS FOR TRANSMITTING AND RECEIVING PERSONAL BROADCASTING DATA BASED ON PEER-TO-PEER COMMUNICATION

(75) Inventors: Guanhua Zhang, Suwon-si (KR); Hee-Seok Yu, Suwon-si (KR); O-Hoon Kwon, Suwon-si (KR); Sung-Bin Im, Yongin-si (KR); Akhil Chapalamadugu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/130,936

(22) PCT Filed: Nov. 3, 2009

(86) PCT No.: PCT/KR2009/006399
§ 371 (c)(1),
(2), (4) Date: May 24, 2011

(87) PCT Pub. No.: WO2010/058919
PCT Pub. Date: May 27, 2010

(65) Prior Publication Data
US 2011/0231487 A1     Sep. 22, 2011

Related U.S. Application Data

(60) Provisional application No. 61/117,272, filed on Nov. 24, 2008.

(30) Foreign Application Priority Data

Jan. 15, 2009     (KR) .................. 10-2009-0003409

(51) Int. Cl.
*H04L 12/66* (2006.01)
*H04N 21/262* (2011.01)
(Continued)

(52) U.S. Cl.
CPC ........... *H04L 12/66* (2013.01); *H04L 65/4076* (2013.01); *H04L 67/104* (2013.01);
(Continued)

(58) Field of Classification Search
CPC .................. H04N 21/26283; H04N 21/47214; H04N 5/44543; H04N 21/632; H04L 67/104
(Continued)

(56) References Cited

U.S. PATENT DOCUMENTS 7,694,319 B1 * 4/2010 Hassell .............. H04N 5/44543
725/136
2001/0051037 A1 * 12/2001 Safadi et al. ................... 386/83
(Continued)

FOREIGN PATENT DOCUMENTS

JP     2002-529972 A     9/2002
JP     2005006041        1/2005
(Continued)

OTHER PUBLICATIONS

Extended European Search Report issued on Feb. 27, 2012 by the European Patent Office in the counterpart European Patent Application No. 09827684.3.
(Continued)

*Primary Examiner* — Un C Cho
*Assistant Examiner* — Fangyan Deng
(74) *Attorney, Agent, or Firm* — Sughrue Mion, PLLC

(57) ABSTRACT

Provided is a method of transmitting and receiving personal broadcasting data in a peer-to-peer (P2P) based network. A terminal (client) that receives a personal broadcast requests a tracker server for a viewing reservation by using electronic program guide (EPG) information or a uniform resource locator (URL) of a personal broadcasting channel, a terminal (broadcaster) that transmits personal broadcasting data
(Continued)

receives a list of clients that made a viewing reservation of the personal broadcast from the tracker server and notifies the clients about starting of the personal broadcast when it is time to start the personal broadcast. Accordingly, the client starts streaming when notified of the starting of the personal broadcast by connecting to the personal broadcasting channel after making the viewing reservation, without having to wait for the personal broadcast to start.

26 Claims, 8 Drawing Sheets

(51) Int. Cl.
  *H04N 21/472* (2011.01)
  *H04N 21/4788* (2011.01)
  *H04N 21/63* (2011.01)
  *H04N 21/858* (2011.01)
  *H04L 29/06* (2006.01)
  *H04L 29/08* (2006.01)

(52) U.S. Cl.
  CPC ... *H04N 21/26283* (2013.01); *H04N 21/4788* (2013.01); *H04N 21/47214* (2013.01); *H04N 21/632* (2013.01); *H04N 21/8586* (2013.01)

(58) Field of Classification Search
  USPC ........................................... 709/203; 725/58
  See application file for complete search history.

(56) References Cited

U.S. PATENT DOCUMENTS

| | | | |
|---|---|---|---|
| 2003/0028896 A1* | 2/2003 | Swart ................. | H04N 7/17318 725/127 |
| 2003/0110503 A1* | 6/2003 | Perkes ............................ | 725/86 |
| 2003/0126277 A1 | 7/2003 | Son et al. | |
| 2003/0149978 A1* | 8/2003 | Plotnick ......................... | 725/39 |
| 2004/0148434 A1 | 7/2004 | Matsubara et al. | |
| 2005/0120390 A1 | 6/2005 | Nonoyama | |
| 2005/0198317 A1 | 9/2005 | Byers | |
| 2006/0259924 A1* | 11/2006 | Boortz ............................ | 725/32 |
| 2007/0275696 A1* | 11/2007 | Cheng et al. .............. | 455/412.1 |
| 2008/0133758 A1 | 6/2008 | Lee et al. | |
| 2008/0134258 A1* | 6/2008 | Goose et al. ................... | 725/91 |
| 2008/0160911 A1 | 7/2008 | Chou et al. | |
| 2008/0163324 A1 | 7/2008 | Chen | |
| 2008/0189702 A1 | 8/2008 | Morgan et al. | |
| 2008/0208976 A1* | 8/2008 | Chapalamadugu ... | H04L 67/104 709/205 |
| 2008/0235331 A1 | 9/2008 | Melamed et al. | |
| 2008/0235746 A1 | 9/2008 | Peters et al. | |
| 2008/0253444 A1* | 10/2008 | Ho ........................... | 375/240.01 |
| 2009/0089397 A1* | 4/2009 | Mori ................... | H04L 12/1881 709/217 |
| 2015/0222953 A1 | 8/2015 | Hassell et al. | |

FOREIGN PATENT DOCUMENTS

| | | | |
|---|---|---|---|
| JP | 2005136824 A | | 5/2005 |
| KR | 1020030056701 A | | 7/2003 |
| KR | 2003-0088253 A | | 11/2003 |
| WO | 2005/091595 A1 | | 9/2005 |
| WO | 2006/036763 A2 | | 4/2006 |
| WO | 2007095309 A2 | | 8/2007 |
| WO | 2007149186 A2 | | 12/2007 |
| WO | 2008064356 A1 | | 5/2008 |

OTHER PUBLICATIONS

Extended European Search Report issued on Mar. 28, 2012 by the European Patent Office in the counterpart European Patent Application No. 09827658.7.
Lui, S. M. et al. "Interoperability of Peer-to-Peer Sharing Protocols", ACM SIGecom Exchanges, vol. 3, No. 3, Aug. 2002, pp. 25-33.
International Search Report (PCT/ISA/210) dated Jun. 22, 2010, in PCT/KR2009/006399.
Written Opinion (PCT/ISA/237) dated Jun. 22, 2010, in PCT/KR2009/006399.
Communication dated Jul. 3, 2013 issued by the State Intellectual Property Office of P.R. China in counterpart Chinese Patent Application No. 200980146961.0.
Communication dated Jul. 24, 2013 issued by the State Intellectual Property Office of P.R. China in counterpart Chinese Patent Application No. 200980146325.8.
Communication dated Feb. 19, 2010 issued by the European Patent Office in counterpart European Patent Application No. 09170797.6.
Communication dated May 11, 2010 issued by the European Patent Office in counterpart European Patent Application No. 09170797.6.
Communication dated Mar. 21, 2011 issued by the European Patent Office in counterpart European Patent Application No. 09 170 797.6.
Communications (PCT/ISA/210 & PCT/ISA/237) dated Mar. 31, 2010 issued by the International Searching Authority in counterpart International Application No. PCT/KR2009/004524.
Communication dated Mar. 18, 2014 issued by the State Intellectual Property Office of the People's Republic of China in counterpart Chinese Patent Application No. 200980146961.0.
Communication dated Apr. 17, 2014 issued by the State Intellectual Property Office of the People's Republic of China in counterpart Chinese Patent Application No. 200980146325.8.
Communication issued Dec. 2, 2014 by the Korean Intellectual Property Office in related application No. 1020090003409.
Communication dated Jul. 29, 2015, issued by the Korean Intellectual Property Office in counterpart Korean Application No. 10-2009-0006272.
Communication dated Oct. 10, 2014 issued by the State Intellectual Property Office of the People's Republic of China in counterpart Chinese Patent Application No. 200980146961.0.
Communication dated Feb. 23, 2016 issued by the Korean Intellectual Property Office in counterpart Application No. 10-2009-0003409.
Communication dated May 5, 2015 issued by the State Intellectual Property Office of the People's Republic of China in counterpart Chinese Patent Application No. 200980146961.0.

* cited by examiner

FIG. 7

```
<ChannelList>
    <channel id="131080">  ———— 701
        <title>Africa Tour</title>  ———— 702
        <genre>documentary</genre>
        <description>daily life record in Africa</description>
        <publisher>norton</publisher>
        <category>PremiumContents</category>
        <starttime>20080905160000</starttime>  ———— 704
        <programList count="2">
            <program id="100" number="1">
                <title>Buzz</title>
                <description>no desc</description>
                <duration>01100300</duration>  ———— 703
                <thumbnail>131080100.jpg</thumbnail>
            </program>
            <program id="101" number="2">
                <title>T2</title>
                <desc>no desc</desc>
                <duration>00301000</duration>
                <thumbnail>131080101.jpg</thumbnail>
            </program>
        </programList>
    </channel>
    <channel id="131081">
        <title>Gameshow</title>
        <genre>comedy</genre>
        <description>Indian gameshow host slapped contestant</description>
        <publisher>steven</publisher>
        <category>UserCreatedContents</category>
        <starttime>20080905161000</starttime>
        <programList count="1">
            <program id="100" number="1">
                <title>Gameshow Host Slapped Contestant</title>
                <description>no desc</description>
                <duration>00100300</duration>
                <thumbnail>131081100.jpg</thumbnail>
            </program>
        </programList>
    </channel>
</ChannelList>
```

METHOD AND APPARATUS FOR TRANSMITTING AND RECEIVING PERSONAL BROADCASTING DATA BASED ON PEER-TO-PEER COMMUNICATION

CROSS-REFERENCE TO RELATED PATENT APPLICATIONS

This application is a National Stage of International Application No. PCT/KR2009/006399 filed Nov. 3, 2009, claiming priority based on U.S. Provisional Application No. 61/117,272 filed on Nov. 24, 2008, and Korean Patent Application No. 10-2009-0003409 filed on Jan. 15, 2009, in the Korean Intellectual Property Office, the disclosures of which are incorporated herein by reference in their entirety.

BACKGROUND

1. Field

Methods and apparatuses consistent with the inventive concept relate to transmitting and receiving personal broadcasting data by using peer-to-peer (P2P) communication.

2. Description of Related Art

Unlike a server-client model, where a plurality of clients receive a service from a server as resources are concentrated on a central server, network participants exchange data as equal peers in a peer-to-peer (P2P) based network.

The network participants can share each other's digital contents via P2P communication, and one of the network participants can directly transmit a broadcast to other network participants in real time by generating a personal broadcasting channel.

FIG. 1 is a diagram illustrating a conventional P2P based method of transmitting and receiving personal broadcasting data.

In operation 101, a first terminal (broadcaster) that transmits personal broadcasting data registers a personal broadcasting channel in a tracker server. Here, the tracker server manages a list of personal broadcasting channels in a P2P based network.

In operation 102, the broadcaster starts a broadcast.

In operation 103, a second terminal (client) that wishes to view a personal broadcast obtains the list of personal broadcasting channels from the tracker server.

In operation 104, the client selects a channel according to a user input.

In operation 105, the broadcaster transmits the personal broadcasting data to the client via streaming.

In a conventional P2P based personal broadcast, a client is unable to determine information about or broadcast starting times of programs of various personal broadcasting channels. Also, since there is no method of making a reservation to view a personal broadcast, the client needs to wait until a desired program is broadcast after connecting to a personal broadcasting channel.

SUMMARY

The inventive concept provides a method of transmitting and receiving personal broadcasting data, wherein a broadcast of a personal broadcasting channel may be reserved in a peer-to-peer (P2P) based network.

According to an aspect of an exemplary embodiment, the client may make a viewing reservation by using the information about the personal broadcasting channel. Also, the broadcaster may obtain a list of clients that made a viewing reservation on the personal broadcasting channel. The list may be used for various purposes, for example, for totaling program ratings.

According to an aspect of an exemplary embodiment, there is provided a method of receiving a personal broadcast of a second terminal by using peer-to-peer (P2P) communication, the method including: transmitting by a first terminal information about a user made reservation to view the personal broadcast to a tracker server which provides the information to the second terminal; and starting streaming by the first terminal with the second terminal when the second terminal notifies the first terminal that the personal broadcast is starting.

The method may further include: receiving from the tracker server, by the first terminal, timeline based electronic program guide (EPG) information about a personal broadcasting channel of the second terminal; and displaying by the first terminal the EPG information via a user interface for a user to make the user-made reservation.

The method may further include receiving from the second terminal by the first terminal a uniform resource locator (URL) of a personal broadcasting channel of the second terminal, wherein the information is generated based on the URL.

The EPG information may be based on extensible markup language (XML).

The method may further include synchronizing by the first terminal the received EPG information with the second terminal.

According to another aspect of the inventive concept, there is provided a non-transitory computer readable recording medium having recorded thereon a program for executing the method.

According to another aspect of the inventive concept, there is provided a method of transmitting a personal broadcast by using P2P communication, the method including: receiving, from a tracker server, by a terminal a list of at least one client who made a viewing reservation on a personal broadcasting channel of the terminal; and notifying by the terminal the at least one client about starting of the personal broadcast when it is time for the viewing reservation.

The method may further include registering by the terminal timeline based EPG information about the personal broadcasting channel in the tracker server, wherein the viewing reservation by the at least one client is performed by referring to the EPG information registered in the tracker server.

The method may further include transmitting by the terminal a URL of the personal broadcasting channel to at least one client, wherein the viewing reservation by the at least one client is performed by referring to the URL.

According to another aspect of an inventive concept, there is provided a non-transitory computer readable recording medium having recorded thereon a program for executing the method.

According to another aspect of an inventive concept, there is provided an apparatus for providing a personal broadcast by using P2P communication to a first terminal, the apparatus including: a reservation processor which, when an external input for making a reservation to view the personal broadcast is received, transmits information about the reservation to a tracker server which provides the received information to second terminal; and a streaming unit which starts streaming with the second terminal when the starting of the personal broadcast is notified from the second terminal.

The apparatus may further include an EPG processor which receives timeline based EPG information about a personal broadcasting channel of the second terminal from the tracker server and displays the EPG information via a user interface for a user to make the reservation.

The apparatus may further include a URL receiver which receives a URL of a personal broadcasting channel of the second terminal from the second terminal, wherein the reservation processor generates the information based on the URL.

According to another aspect of an inventive concept, there is provided an apparatus for transmitting a personal broadcast by using P2P communication, the apparatus including: a receiver which receives a list of at least one client that made a viewing reservation of a personal broadcasting channel from a tracker server; and a notifying unit which notifies said at least one client about starting of the personal broadcast, when it is time for the viewing reservation.

The apparatus may further include an EPG registering unit which registers timeline based EPG information about the personal broadcasting channel in the tracker server, wherein the viewing reservation by the at least one client is performed by referring to the EPG information registered in the tracker server.

According to yet another aspect of an inventive concept, there is provided a system of managing personal broadcast. The system includes a first terminal that broadcasts the personal broadcast, a second terminal that requests the personal broadcast, and a server which registers the personal broadcast of the first terminal, notifies the second terminal of availability of the personal broadcast, and provides a list of registered terminals comprising the second terminal to the first terminal. In this system, the personal broadcast is obtained in a peer-to-peer network in which each of the first and second terminals are peers that serve as at least one of a client and a broadcaster.

BRIEF DESCRIPTION OF THE DRAWINGS

The above and other aspects of inventive concepts will become more apparent by describing in detail exemplary embodiments thereof with reference to the attached drawings in which:

FIG. 7 is a diagram of extensible markup language (XML) based EPG information according to an exemplary embodiment.

DETAILED DESCRIPTION OF EXEMPLARY EMBODIMENTS

Hereinafter, exemplary embodiments will be described more fully with reference to the accompanying drawings.

Figure 1:
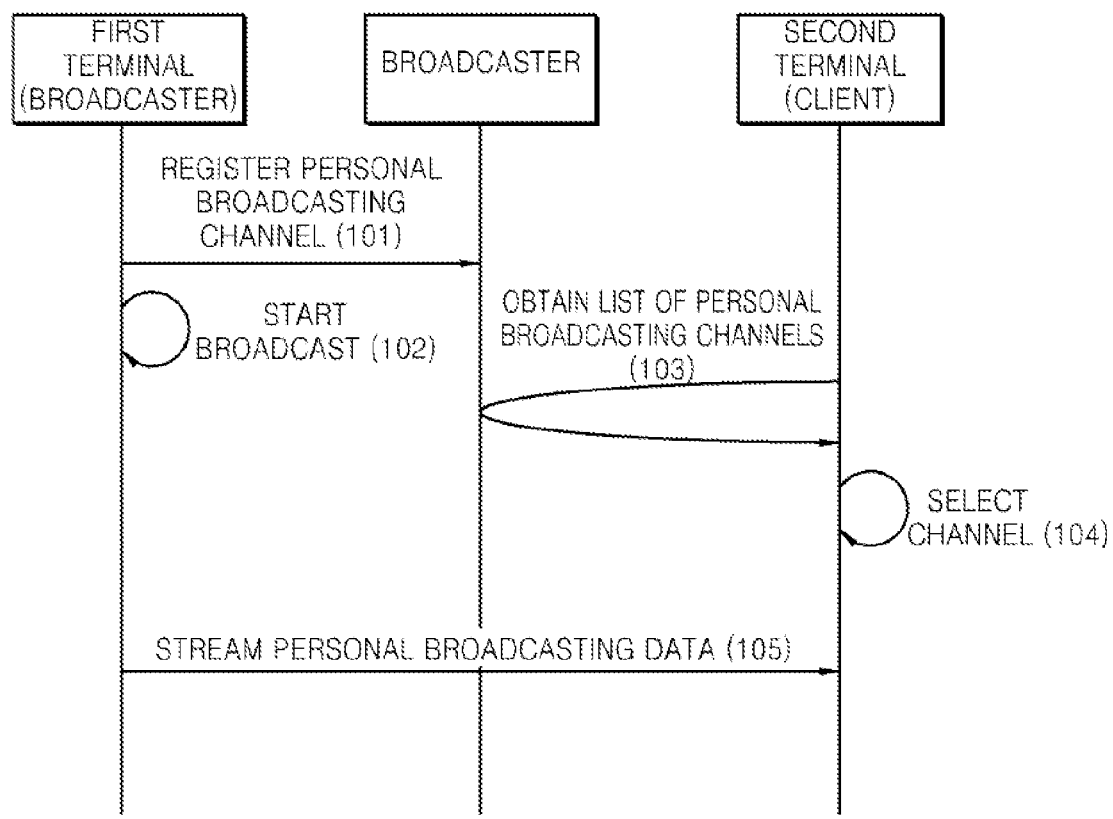
FIG. 1 is a diagram illustrating a conventional P2P based method of transmitting and receiving personal broadcasting data.
Figure 2:
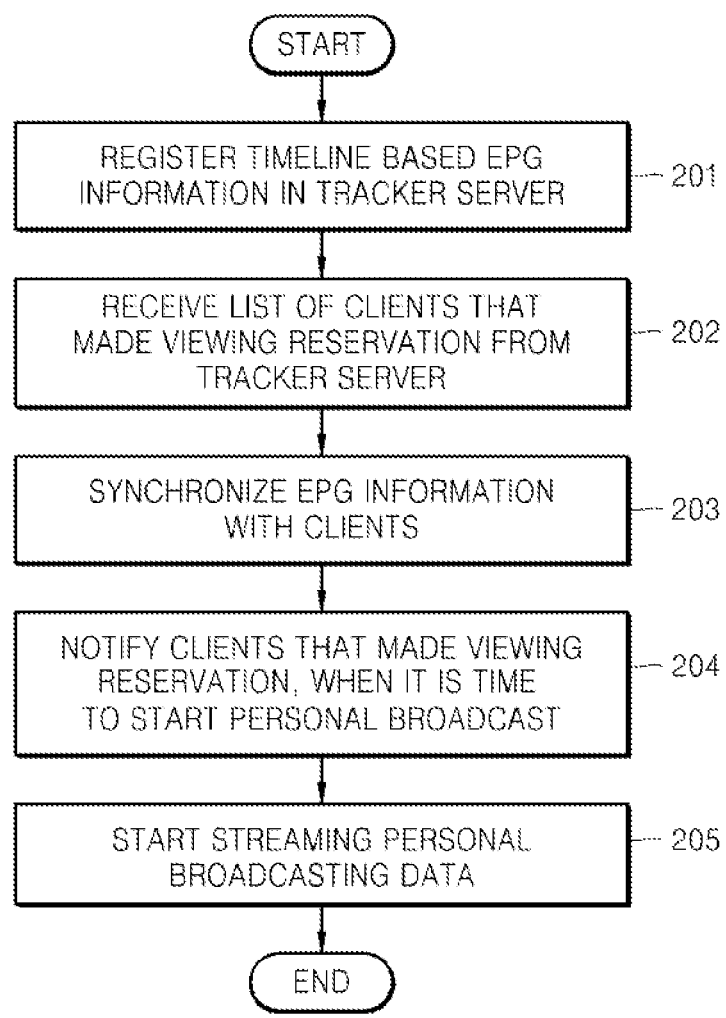
FIG. 2 is a flowchart illustrating a method of transmitting personal broadcasting data, according to an exemplary embodiment.

FIG. 2 is a flowchart illustrating a method of transmitting personal broadcasting data, according to an exemplary embodiment.

Herein, a terminal that transmits personal broadcasting data will be referred to as a broadcaster, and a terminal that receives personal broadcasting data will be referred to as a client.

In operation 201, a broadcaster registers timeline based electronic program guide (EPG) information in a tracker server as a part of channel information. The EPG information includes information about programs of personal broadcasting channels, such as a title of a program, a starting time of a program, and a length of a program. That is, a personal broadcasting channel may be a custom channel developed by a user which includes programs selected by a user and provided by a user at a specified time. A personal broadcasting channel is a channel designed by a user in which the user specifies programs to broadcast and times to broadcast them at.

The EPG information may be based on extensible markup language (XML). An example of XML based EPG information is illustrated in FIG. 7, which is described in further detail below.

The EPG information registered in the tracker server is transmitted to a client, and the client may request a viewing reservation to the tracker server by referring to the EPG information.

In operation 202, the broadcaster receives, from the tracker server, a list of clients that made a viewing reservation on a personal broadcasting channel.

In operation 203, the broadcaster synchronizes the EPG information with one or more clients. Due to characteristics of a personal broadcast, broadcast programming or broadcasting times may frequently change, and thus synchronization with the EPG information is important. The synchronization of the EPG information may be performed via the tracker server, or directly performed between the broadcaster and one or more clients. Also, the synchronization of the EPG server may be performed periodically, or when a change occurs.

Accordingly, in FIG. 2, operation 203 is performed between operations 202 and 204, but may be performed at another time.

In operation 204, when it is time to start the personal broadcast, the broadcast notifies the clients that made the viewing reservation about the starting of the personal broadcast. Although the clients are aware of a starting time of the personal broadcast based on the EPG information, the broadcaster may notify the clients so as to start streaming in the case when the synchronization with the EPG information is not completed or when there is a real time clock (RTL) difference between the broadcaster and the respective client.

In operation 205, the broadcaster starts streaming of the personal broadcasting data.

Figure 3:
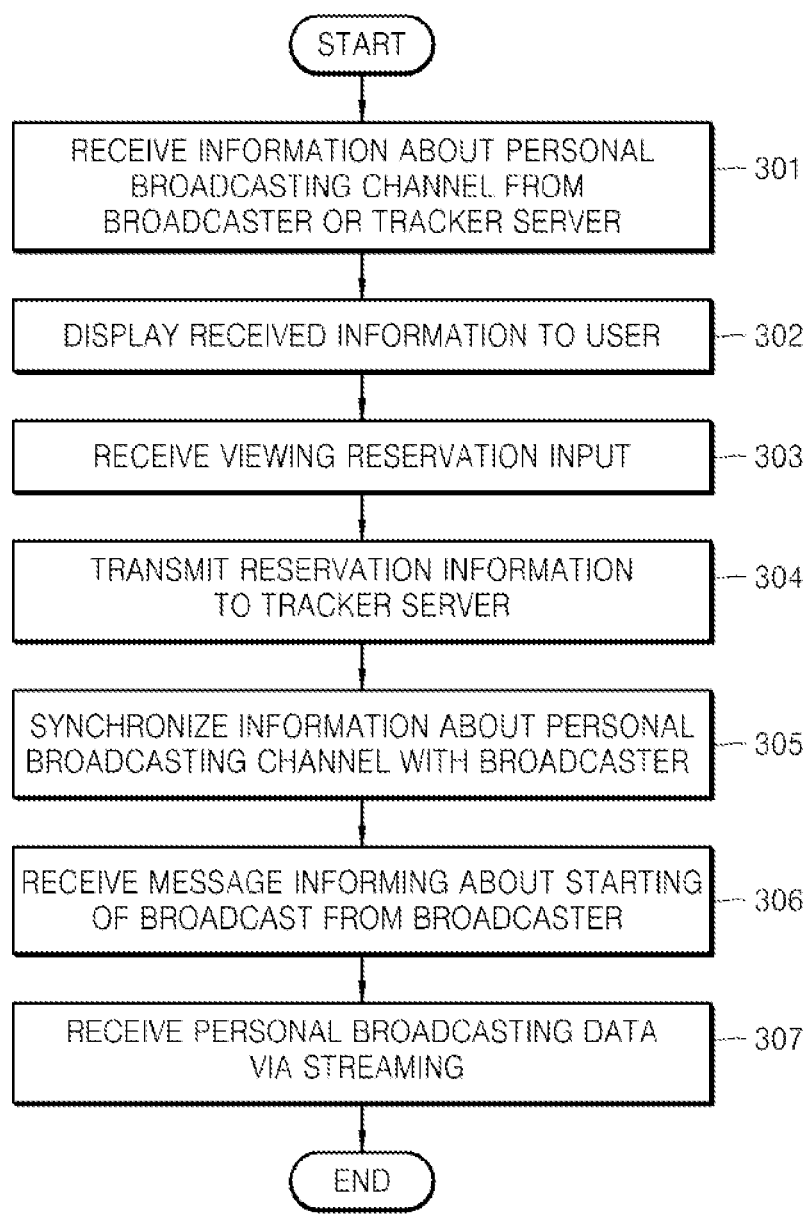
FIG. 3 is a flowchart illustrating a method of receiving personal broadcasting data, according to an exemplary embodiment.

FIG. 3 is a flowchart illustrating a method of receiving personal broadcasting data, according to an exemplary embodiment.

In operation 301, a client receives information about a personal broadcasting channel from a broadcaster or a tracker server. Here, the information is required for the client to make a viewing reservation on a personal broadcasting channel. The information may be EPG information or a uniform resource locator (URL) of a corresponding broadcasting channel.

In operation 302, the client displays the received information to a user via a user interface.

In operation 303, the client receives a viewing reservation input from the user.

In operation 304, the client transmits reservation information, which is generated based on the viewing reservation input and required to request a viewing reservation, to the tracker server.

In operation 305, the client synchronizes the information about the personal broadcasting channel with the broadcaster. In other words, the client synchronizes EPG information or a URL of a broadcasting channel of the broadcaster with the broadcaster. Such synchronization may be performed periodically or whenever a change occurs, like in the method of FIG. 2. Also, the synchronization may be performed via the tracker server or directly between the broadcaster and the client.

In operation 306, the client receives a message which informs the user about the start of a broadcast, from the broadcaster of the personal broadcasting channel in regard to which the client made a viewing reservation.

In operation 307, the client receives personal broadcasting data from the broadcaster via streaming.

As such, according to an exemplary embodiment, the client may make a viewing reservation by using information provided on the personal broadcasting channel. Also, the broadcaster may obtain a list of clients that made a viewing reservation using the personal broadcasting channel. The list may be used for various purposes, for example, for totaling program ratings.

Figure 4:
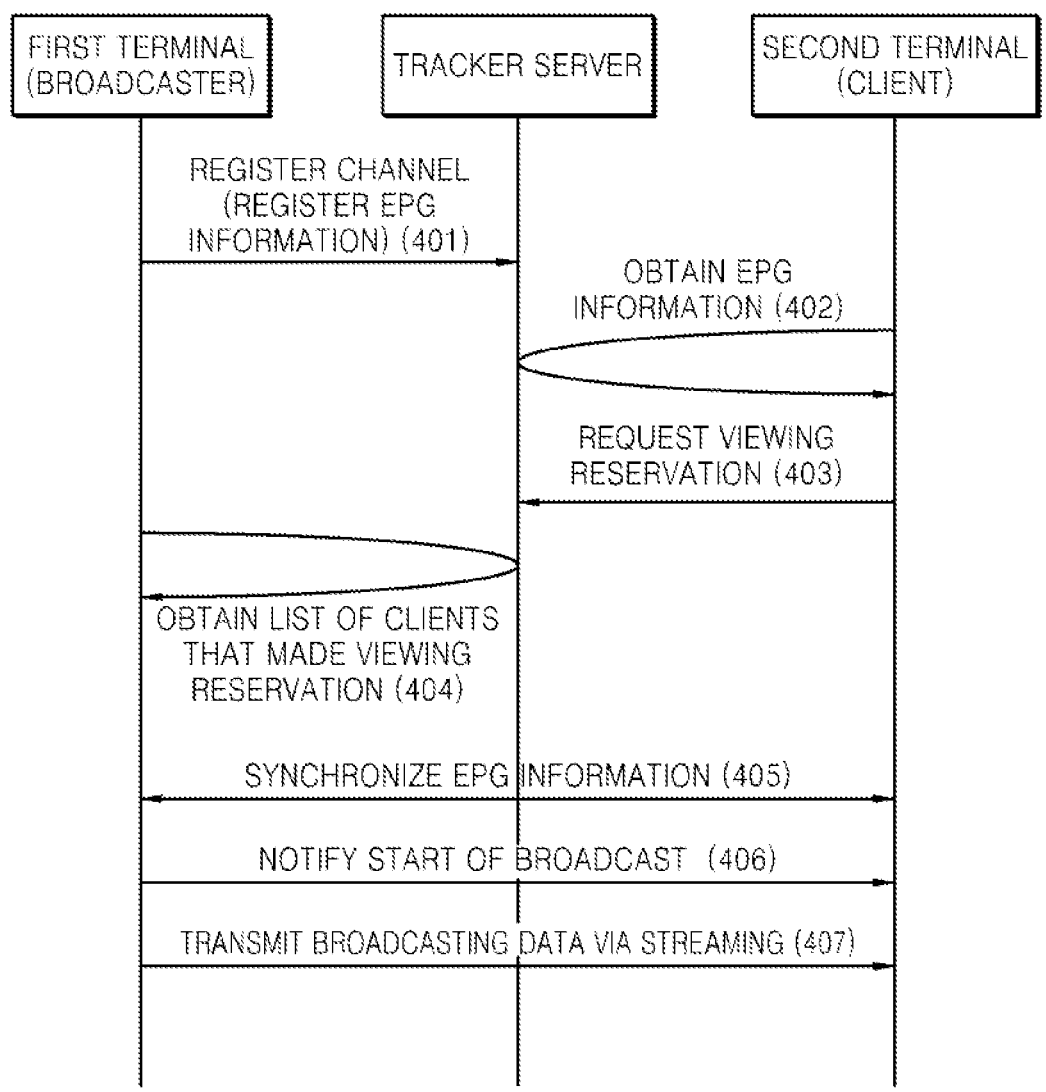
FIG. 4 is a diagram illustrating a method of transmitting and receiving personal broadcasting data by using electronic program guide (EPG) information, according to an exemplary embodiment.

FIG. 4 is a diagram illustrating a method of transmitting and receiving personal broadcasting data by using EPG information, according to an exemplary embodiment.

In operation 401, a first terminal (broadcaster) registers a personal broadcasting channel in a tracker server. At this time, timeline based EPG information about the personal broadcasting channel of the first terminal is also registered in the tracker server.

In operation 402, a second terminal (client) receives the EPG information from the tracker server.

In operation 403, the second terminal requests the tracker server for a viewing reservation so as to view the personal broadcasting channel at a certain time.

In operation 404, the first terminal receives, from the tracker server, a list of clients that made a viewing reservation on the personal broadcasting channel. The list may include the second terminal.

In operation 405, the first and second terminals synchronize the EPG information. As described above, the synchronization may be performed periodically or whenever there is a change in the EPG information. Also, the synchronization may be performed via the tracker server directly between the first and second terminals.

In operation 406, when it is the time that the second terminal made the viewing reservation, the first terminal notifies the second terminal about the starting of a broadcast.

In operation 407, the first terminal transmits personal broadcasting data to the second terminal via streaming.

Figure 5:
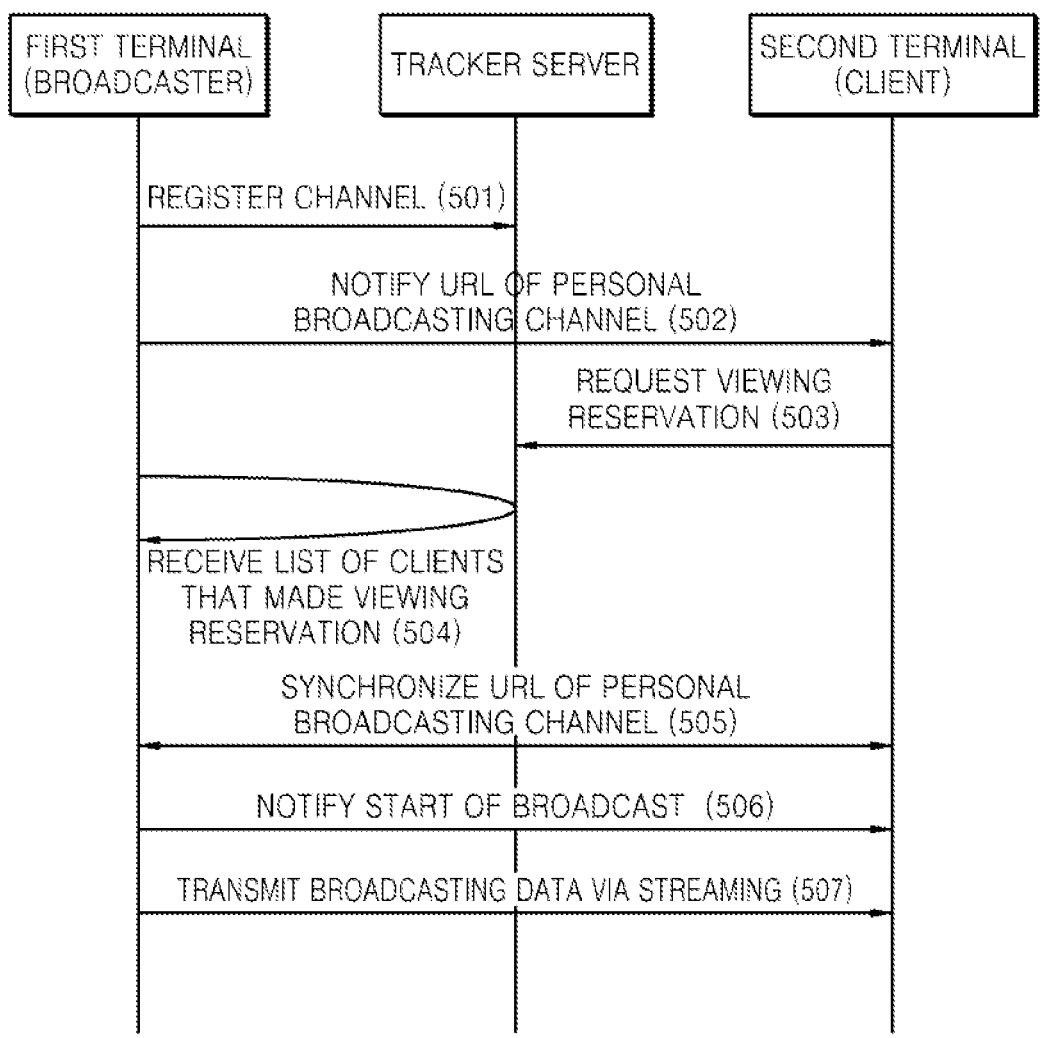
FIG. 5 is a diagram illustrating a method of transmitting and receiving personal broadcasting data by using a uniform resource locator (URL) of a personal broadcasting channel, according to an exemplary embodiment.

FIG. 5 is a diagram illustrating a method of transmitting and receiving personal broadcasting data by using a URL of a personal broadcasting channel, according to an exemplary embodiment.

In operation 501, a first terminal (broadcaster) registers a personal broadcasting channel in a tracker server. At this time, EPG information may also be registered.

In operation 502, the first terminal notifies a second terminal (client) about a URL of the personal broadcasting channel. Such a notification may be performed by using any one of various methods. For example, the notification may be performed by using a messenger program. Meanwhile, the URL may be a URL for connecting to the personal broadcasting channel or a URL for requesting a viewing reservation on a corresponding channel.

In operation 503, the second terminal requests a viewing reservation for viewing the personal broadcasting channel of the first terminal at a predetermined time to the tracker server by using the URL.

In operation 504, the first terminal receives a list of clients that made a viewing reservation on the personal broadcasting channel from the tracker server. The list may include the second terminal.

In operation 505, the first and second terminals synchronize the URL. As described above, the synchronization may be performed periodically or whenever a change occurs in the URL. Also, the synchronization may be performed via the tracker server or directly between the first and second terminals.

Aside from the URL, the first terminal may register EPG information in the tracker server, and the second terminal may read the EPG information from the tracker server at any time. Accordingly, synchronization of the EPG information may be performed independently from the synchronization of the URL.

In operation 506, when it is the time that the second terminal made the viewing reservation, the first terminal notifies the second terminal about the starting of a broadcast.

In operation 507, the first terminal transmits personal broadcasting data to the second terminal via streaming.

Figure 6:
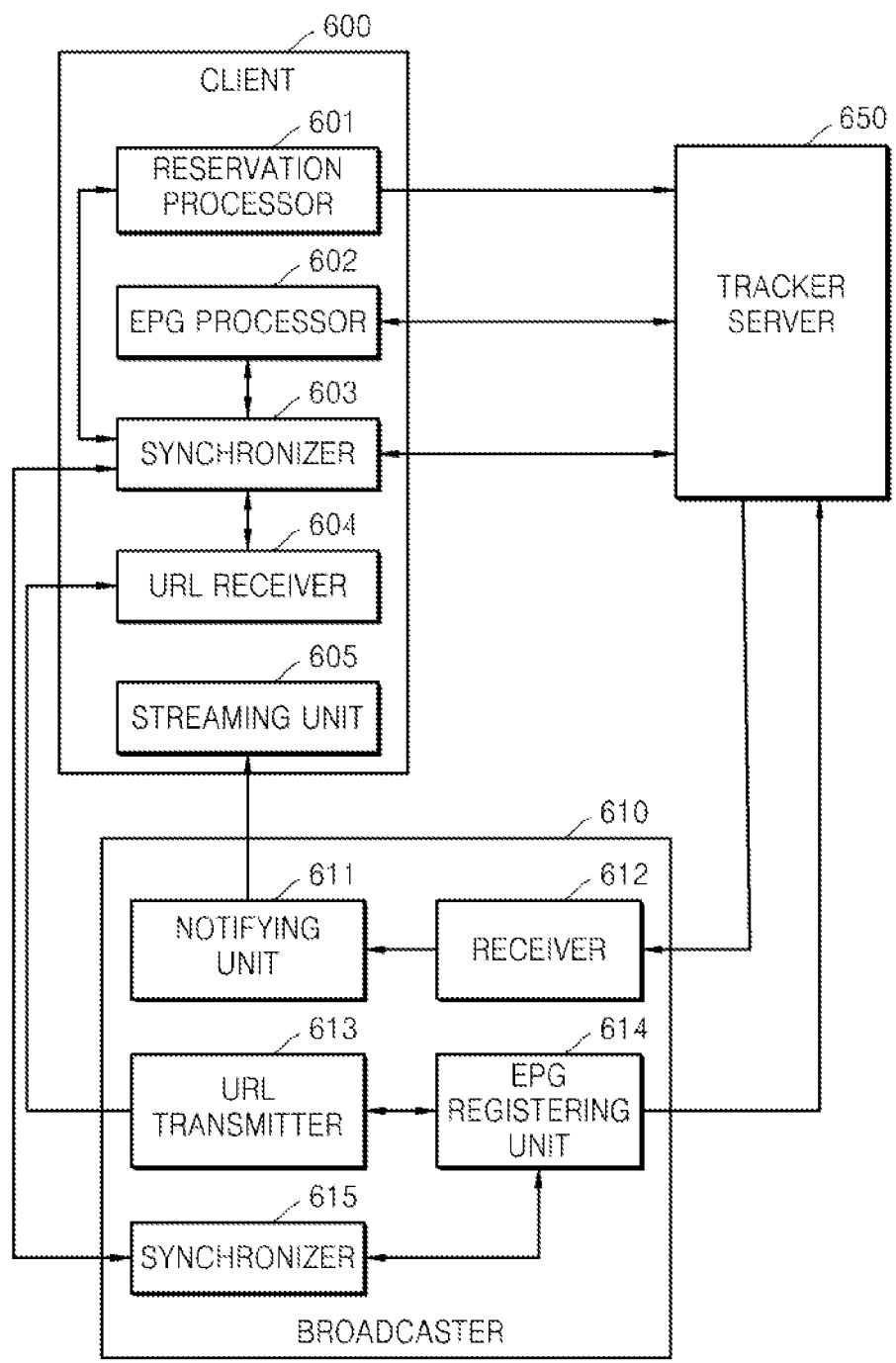
FIG. 6 is a block diagram illustrating a structure of a broadcaster and a client, according to an exemplary embodiment.

FIG. 6 is a block diagram illustrating a structure of a broadcaster 610 and a client 600, according to an exemplary embodiment.

As shown in FIG. 6, the client 600 includes a reservation processor 601, an EPG processor 602, a synchronizer 603, a URL receiver 604, and a streaming unit 605.

When an external input which makes a viewing reservation to view a personal broadcast of the broadcaster 610 at a certain time is received from a user, the reservation processor 601 generates information about the viewing reservation based on EPG information or a URL of a personal broadcasting channel of the broadcaster 610, and transmits the generated information to a tracker server 650 so as to request the viewing reservation on the personal broadcasting channel.

The EPG processor 602 obtains timeline based EPG information about the personal broadcasting channel from the tracker server 650, and displays the EPG information via a user interface so that the user can reference the EPG information during the viewing reservation.

The synchronizer 603 synchronizes the EPG information or the URL with the broadcaster 610. Here, the synchronization may be performed periodically or whenever there is a change in the EPG information or the URL. Also, the synchronization may be performed indirectly via the tracker server 650 or directly between the broadcaster 610 and the client 600.

The URL receiver 604 receives the URL of the personal broadcasting channel from the broadcaster 610.

When a message informing about the starting of a broadcast is received from the broadcaster 610, the streaming unit 605 receives personal broadcasting data of the broadcaster 610 via streaming.

Meanwhile, as shown in FIG. 6, the broadcaster 610 includes a notifying unit 611, a receiver 612, a URL transmitter 613, an EPG registering unit 614, and a synchronizer 615.

When it is time to play the viewing reservation, the notifying unit 611 notifies clients, which made a viewing reservation on the personal broadcasting channel of the broadcaster 610, about the starting of a broadcast.

The receiver 612 receives, from the tracker server 650, a list of the clients that made the viewing reservation.

The URL transmitter 613 transmits a URL of the personal broadcasting channel of the broadcaster 610 to the client 600.

The EPG registering unit 614 registers timeline based EPG information about the personal broadcasting channel of the broadcaster 610 in the tracker server 650.

The client 600 may make a viewing reservation by referring to the EPG information or the URL. Accordingly, any one of the URL transmitter 613 and the EPG registering unit 614 may be omitted from the broadcaster 610.

The synchronizer 615 synchronizes the EPG information and/or the URL with the client 600.

FIG. 7 is a diagram of extensible markup language (XML) based EPG information according to an exemplary embodiment.

As shown in FIG. 7, the EPG information including information about a P2P based personal broadcasting channel may be realized using XML. Accordingly, a client may determine a channel identifier (ID) 701, a broadcasting program title 702, a program length 703, a broadcast starting time 704, etc. from the EPG information, and request a tracker server for a viewing reservation based on the EPG information.

Figure 8:
FIG. 8 is a diagram illustrating EPG information displayed via a user interface of a client, according to an exemplary embodiment.

FIG. 8 is a diagram of EPG information displayed via a user interface of a client, according to an exemplary embodiment.

As shown in FIG. 8, a client device displays program information of each of personal broadcasting channels, such as KWON 801a, LEE 801b, ZHANG 801c, RYU 801d, and Mi-D 801e, based on a timeline. Accordingly, a user may make a viewing reservation on a personal broadcasting channel by locating a cursor on a desired program and pressing a viewing reservation button. For example, when the user locates the cursor on Lost_S04_EP01 broadcast by Mi-D 802, and presses the viewing reservation button, the client device performs other operations without connecting to the personal broadcasting channel of Mi-D until Lost_S04_EP01 starts, and starts streaming when the starting of Lost_S04_EP01 is notified from Mi-D.

While exemplary embodiments have been particularly shown and described, it will be understood by those of ordinary skill in the art that various changes in form and details may be made therein without departing from the spirit and scope of the inventive concept as defined by the following claims. The exemplary embodiments should be considered in descriptive sense only and not for purposes of limitation. Therefore, the scope of the invention is defined not by the detailed description of exemplary embodiments but by the appended claims, and all differences within the scope will be construed as being included in the present invention.

The invention claimed is:

1. A method of receiving a personal broadcast of a second terminal by using peer-to-peer (P2P) communication, the method comprising:

transmitting, by a first terminal, to a tracker server, information about a user made reservation to view the personal broadcast that is to be broadcast on a personal broadcasting channel of another user of the second terminal at a predetermined future time using the P2P communication;

transmitting a reservation request to the tracker server which receives the reservation request from multiple clients including the first terminal;

receiving, by the first terminal, a notification message from the second terminal which received from the tracker server, a list of clients which made the reservation requests for the personal broadcast provided by the second terminal, prior to streaming the personal broadcast, wherein the notification message comprises the notification information indicating that the personal broadcast, for which the reservation is made, is to be started on the personal broadcasting channel that is to broadcast the personal broadcast at the predetermined future time;

receiving from the tracker server, by the first terminal, timeline based electronic program guide (EPG) information about the personal broadcasting channel of the second terminal;

synchronizing, by the first terminal, the received EPG information directly with the second terminal based on a change in broadcasting on the personal broadcasting channel; and receiving streaming data by the first terminal after the notification message is received;

wherein the tracker server provides the list of clients, which made the reservation requests to the second terminal which is a provider of the personal broadcast.

2. The method of claim 1, further comprising:
displaying by the first terminal the EPG information via a user interface for a user to make the user-made reservation.

3. The method of claim 1, further comprising receiving from the second terminal by the first terminal a uniform resource locator (URL) of a personal broadcasting channel of the second terminal, wherein the information is generated based on the URL.

4. The method of claim 2, wherein the EPG information is based on extensible markup language (XML).

5. A non-transitory computer readable recording medium having recorded thereon a program for executing the method of claim 1.

6. A method of transmitting a personal broadcast by using P2P communication, the method comprising:

registering, by a terminal in a tracker server, timeline based EPG information about a personal broadcasting channel of a user of the terminal;

receiving, from the tracker server, by the terminal a list of clients which are users of other terminals, each of which made a viewing reservation to view the personal broadcast to be broadcast on a personal broadcasting channel of the terminal at a predetermined future time via the P2P communication;

synchronizing, by the terminal, the EPG information directly with said at least one client based on a change in broadcasting on the personal broadcasting channel; and when the personal broadcast for which the viewing reservation is made is about to start, transmitting a notification message from the terminal to each of the clients on the list, prior to transmitting streaming data, based on the list of clients, wherein the notification message comprises notification information that the personal broadcast for which the reservation is made is about to start on the personal broadcasting channel that is to broadcast the personal broadcast at the predetermined future time based on the list of clients received from the tracker server, and wherein the tracker server provides the list of clients, which made the reservation requests to the second terminal which is a provider of the personal broadcast.

7. The method of claim 6, wherein the viewing reservation by the at least one client is performed by referring to the EPG information registered in the tracker server.

8. The method of claim 6, further comprising transmitting by the terminal a URL of the personal broadcasting channel to at least one client, wherein the viewing reservation by the at least one client is performed by referring to the URL.

9. The method of claim 7, wherein the EPG information is based on XML.

10. A non-transitory computer readable recording medium having recorded thereon a program for executing the method of claim 6.

11. An apparatus for providing a personal broadcast by using P2P communication to a first terminal, the apparatus comprising:

a reservation processor which, when an external input for making a reservation to view the personal broadcast that is to be broadcast on a personal broadcasting channel of a user of a second terminal at a predetermined future time, is received, transmits information about the reservation to a tracker server;

an EPG processor which receives timeline based EPG information about the personal broadcasting channel of the second terminal from the tracker server;

a synchronizer which synchronizes the EPG information of a user of the first terminal directly with the second terminal based on a change in broadcasting on the personal broadcasting channel; and a streaming unit which starts streaming with the second terminal using the P2P communication when the starting of the personal broadcast, for which the reservation is made, is notified from the second terminal which received from the tracker server, a list of clients which made the reservation requests, wherein, when the personal broadcast, for which the reservation is made, is about to start to be broadcast on the personal broadcasting channel and prior to the streaming by the streaming unit, the second terminal transmits a notification message to the first terminal, the notification message comprising information indicating that the personal broadcast, for which the reservation is made, is about to start, and wherein the tracker server provides the list of clients, which made the reservation requests to the second terminal which is a provider of the personal broadcast.

12. The apparatus of claim 11, wherein the EPG processor is configured to control a display of the EPG information via a user interface for the user to make the reservation.

13. The apparatus of claim 11, further comprising a URL receiver which receives a URL of a personal broadcasting channel of the second terminal from the second terminal, wherein the reservation processor generates the information based on the URL.

14. The apparatus of claim 12, wherein the EPG information is based on XML.

15. An apparatus for transmitting a personal broadcast by using P2P communication, the apparatus comprising:

an EPG registering unit which registers, in a tracker server, timeline based EPG information about a personal broadcasting channel of a user of the apparatus;

a receiver which receives, from the tracker server, a list of clients, each of which is a terminal of another user which made a viewing reservation to view the personal broadcast that is to be broadcast via the P2P communication on the personal broadcasting channel at a predetermined future time;

a synchronizer which synchronizes the EPG information of the apparatus directly with the terminal of the at least one client based on a change in broadcasting on the personal broadcasting channel; and a notifying unit which generates a notification message to each of the clients on the list comprising information indicating that the personal broadcast, for which the viewing reservation was made, is about to start on the personal broadcasting channel that is to broadcast the personal broadcast at the predetermined future time based on the list of clients received from the tracker server, and transmitting the generated notification message when it is time for the viewing reservation of the personal broadcast on the personal broadcasting channel and prior to streaming the personal broadcast by the clients on the list, wherein the tracker server provides the list of clients, which made the reservation requests to the receiver, and wherein the apparatus is a provider of the personal broadcast.

16. The apparatus of claim 15, wherein the viewing reservation by the at least one client is performed by referring to the EPG information registered in the tracker server.

17. The apparatus of claim 15, further comprising a URL transmitter which transmits a URL of the personal broadcasting channel to the at least one client, wherein the viewing reservation by the at least one client is performed by referring to the URL.

18. The apparatus of claim 17, wherein the synchronizer synchronizes the EPG information with the at least one client independently from synchronizing of the URL.

19. The apparatus of claim 16, wherein the EPG information is based on XML.

20. A system of managing personal broadcast, the system comprising:

a first terminal that broadcasts the personal broadcast on a personal broadcasting channel of a user of the first terminal;

a second terminal of another user that requests the personal broadcast to be broadcast on the personal broadcast channel by reserving in advance via a viewing reservation that indicates that the second terminal is to tune to the personal broadcasting channel to view the broadcast of the personal broadcast which is to be broadcast at a predetermined future time;

a server which registers the personal broadcast of the first terminal, receives a plurality of reservation requests from a plurality of terminals including the second terminal, and transmits a list of clients that made the plurality reservation requests to the first terminal, which generates individual notification messages to each of the clients on the list, wherein each of the notification messages comprises information indicating that the personal broadcast requested by the second terminal is about to start to be broadcast on the personal broadcasting channel, and transmits the generated notification message to the first terminal when the personal broadcast is about to start, and provides the list of the plurality of terminals to the first terminal for transmission of the individual notification message to each of the plurality of terminals, wherein the personal broadcast is obtained in a peer-to-peer (P2P) network in which each of the first and second terminals are peers that serve as at least one of a client and a broadcaster, wherein the first terminal is a provider of the personal broadcast and the server provides, to the first terminal, the list of client without contents of the personal broadcast, wherein the server receives from the first terminal timeline based electronic program guide (EPG) information about the personal broadcasting channel of the first terminal, and wherein the first terminal synchronizes directly with the second terminal the received EPG information based on a change in broadcasting on the personal broadcasting channel.

21. The system of claim 20, wherein the first terminal notifies the second terminal of the start of the broadcast of the personal broadcast on the personal broadcasting channel based on the list provided by the server and wherein the broadcast of the personal broadcast on the personal broadcasting channel is at a time different from the predetermined future time, as modified by the first terminal.

22. The system of claim 20, wherein the first terminal registers with the server a the personalized channel that comprises electronic programming guide (EPG) information.

23. The system of claim 20, wherein each of the first terminal and the second terminal function as a server and as a client.

24. The system of claim 20, wherein the first terminal is configured to obtain the personal broadcast from the second terminal and the second terminal is configured to obtain the personal broadcast from the first terminal via the server, which is intermediate server that facilitates communication between the first terminal and the second terminal.

25. The method of claim 1, wherein:

the second terminal is a broadcaster which outputs the personal broadcast on the personal broadcasting channel of the second terminal at the predetermined future time, the broadcaster receives from the tracker server a list of clients, which made the reservation requests to view the personal broadcast, the reservation is made by the clients based on the EPG information comprising a personal channel identifier, a name of the personal broadcast, length of the personal broadcast, and a starting time of the personal broadcast, the second terminal individually transmits the notification message to each of the clients on the list in response to the personal broadcast about to start broadcasting on the personal broadcasting channel, and the first terminal displays the EPG information of at least two other terminals including the second terminal, and the notification message is a trigger signaling starting of the personal broadcast without additional information regarding the personal broadcast.

26. The method of claim 25, wherein each of the clients on the list periodically synchronizes directly with the second terminal via a uniform resource locator (URL) for connecting to the personal broadcasting channel of the second terminal and wherein the notification message indicates that the broadcast, for which the reservation is made, is about to start regardless of an actual scheduled time and without providing an end indicator for the program.

* * * * *